United States Patent
Pappas

(10) Patent No.: US 10,218,854 B2
(45) Date of Patent: Feb. 26, 2019

(54) SOUND MODIFICATION FOR CLOSE PROXIMITY SHARED COMMUNICATIONS PATH DEVICES

(71) Applicant: Cloud9 Technologies, LLC, New York, NY (US)

(72) Inventor: Andrew Pappas, Hicksville, NY (US)

(*) Notice: Subject to any disclaimer, the term of this patent is extended or adjusted under 35 U.S.C. 154(b) by 138 days.

(21) Appl. No.: 15/199,988

(22) Filed: Jul. 1, 2016

(65) Prior Publication Data

US 2017/0134588 A1 May 11, 2017

Related U.S. Application Data

(60) Provisional application No. 62/252,352, filed on Nov. 6, 2015.

(51) Int. Cl.
*H04M 9/08* (2006.01)
*H04M 3/00* (2006.01)
*H04M 7/00* (2006.01)

(52) U.S. Cl.
CPC .......... *H04M 9/082* (2013.01); *H04M 3/002* (2013.01); *H04M 7/009* (2013.01)

(58) Field of Classification Search
CPC ...... G10L 19/008; H04L 65/403; H04M 3/51; H04M 3/56; H04M 3/568

USPC ....................................... 379/406.01–406.16
See application file for complete search history.

(56) References Cited

U.S. PATENT DOCUMENTS

| | | | | |
|---|---|---|---|---|
| 6,728,222 B1* | 4/2004 | Ono | ................... | H04L 12/1813 370/260 |
| 2007/0112942 A1* | 5/2007 | Moquin | ............. | H04L 12/2803 709/220 |
| 2008/0159178 A1* | 7/2008 | Syrjanen | ............. | H04L 12/1827 370/261 |
| 2010/0020954 A1* | 1/2010 | Gilg | ........................ | H04M 3/56 379/202.01 |
| 2015/0085063 A1* | 3/2015 | Fish | ........................ | G06F 3/041 348/14.08 |
| 2015/0365762 A1* | 12/2015 | Truon | ..................... | H04R 3/005 381/71.1 |
| 2016/0192069 A1* | 6/2016 | McIntosh | ................. | H04R 1/04 381/56 |
| 2016/0330396 A1* | 11/2016 | Garcia Navarro | ...... | G10L 21/10 |
| 2018/0013982 A1* | 1/2018 | Mann | ................... | G06Q 10/101 |

* cited by examiner

*Primary Examiner* — Solomon G Bezuayehu
(74) *Attorney, Agent, or Firm* — Richard M. Lehrer; FisherBroyles, LLP

(57) ABSTRACT

Systems and methods are provided for attenuating a communications channel on one or more speakerphones which are located in close physical proximity to one another and which are being used on the same call.

18 Claims, 8 Drawing Sheets

Speakerphone A

Speakerphone B

Speakerphone C

Speakerphone D

SOUND MODIFICATION FOR CLOSE PROXIMITY SHARED COMMUNICATIONS PATH DEVICES

FIELD OF THE INVENTION

The technology of this disclosure relates generally to telecommunications, and more specifically but not exclusively to attenuation of sound on a communication channel when multiple speakerphones participating in a common call are located within close proximity to one another.

BACKGROUND OF THE INVENTION

In the financial industry often times trading desks at a bank will include multiple people who trade the same types of equities or securities ("Traders"). These Traders tend to be located in close physical proximity to one another and will often participate in the same conference calls. However, even though they are in close physical proximity to one another, rather than using a hand held receiver or a headset, these Traders will oftentimes use their speakerphones. Additionally, these speakerphones are typically set to volumes that far exceed the background and room noise so that the Traders can hear the information being communicated. Because of the close physical proximity of the various speakerphones that are each transmitting and receiving the same information, when a Trader in the room speaks it can cause disruptive issues.

Some of the disruptive issues may include:
1. Audio delay introduced by the system.
a) When a Trader hears a repeat of his/her own voice within a few milliseconds it will typically not be perceived as a problem nor cause a disruption. However, as the audio delay increases there is a point at which the Trader who is speaking will perceive his/her own voice as what may be described as "echo" or "reverb" and it will disrupt the ability of that Trader to speak and increase listener fatigue.
b) When a Trader speaks on a communication channel that is shared by other Traders in close proximity, there will be people in the room who will hear that Trader's voice directly rather than through the communication channel. Those who are close enough to hear the Trader speak without the conference call will hear the Trader's voice at least two times, once through the direct medium of air and then at least a second time through the speakerphone(s); including early reflections and reverberations. The audio broadcasting from the speakerphone(s) will be a delayed version of the sound travelling through the direct medium and include reverberation. As the audio delay exceeds 20 msec and volume increases, as with many open speaker communication systems, the people who hear the Trader's actual voice will perceive it as "echo" and it will impair the ability of those who are trying to listen to what is being said, as well as make it harder for those who are trying to ignore it.
2. Reverberation
a) When a Trader speaks on a communication channel that is broadcast through speakerphones which are in close proximity to the Trader, the Trader's voice will reflect off of surfaces in the room and can make its way through multiple paths back to the Trader's microphone. That reflected voice is then retransmitted to all speakerphones on the call. This in effect increases the reverberation time and effects both the Trader who is speaking and the listeners' ability to listen to or ignore the conversation.

3) Feedback Howling
a) Speakerphones in close proximity to other speakerphones on a common call are subject to a ringing that can build to a sustained and very disruptive howl due to the feedback between the various speakerphones. The howl will prevent participants in the conference call from using the channel.

It would thus be advantageous to create a system of speakerphones which are aware of other speakerphones within close proximity so that when they are attached to a common communication channel and a person speaks into one speakerphone the remaining speakerphones modify access to the communication channel to minimize one or more of the above disruptive issues. It would be advantageous to create a system of speakerphones that could be manually configured to know which other speakerphones are within close proximity. It would be advantageous to create a system of speakerphones that could be automatically configured to know when other speakerphones connected to a common communication channel are within close proximity.

BRIEF SUMMARY OF THE INVENTION

Many advantages will be determined and are attained by the disclosed technology, which in a broad sense provides speakerphones which attenuate sound transmissions when they are determined to be in close proximity to other speakerphones which are connected to a common communication channel.

One or more embodiments of the technology provides a system for attenuating a communication channel. The system includes a customer premises equipment ("CPE") configured to electrically communicate with multiple speakerphones. The CPE is also configured to identify at least two of the speakerphones as neighbors. The CPE is configured to communicate with a remote terminal (such as another speakerphone, another CPE or another phone) via a communication channel and to apply audio attenuation to the neighbor speakerphones when the neighbor speakerphones are simultaneously connected to the communication channel.

One or more embodiments of the technology provides a method of attenuating a speakerphone, wherein at least two speakerphones are connected to a common communication channel. The method includes a customer premises equipment ("CPE") detecting that the speakerphones are located in close physical proximity to each other and that a voice signal is being received by a microphone of one of the speakerphones. The CPE then applies audio attenuation to another of the speakerphones.

One or more embodiments of the technology provides a method of attenuating a speakerphone. The method includes a speakerphone determining that at least one other speakerphone is located in close physical proximity thereto. The speakerphone connects to a communication channel and determines that the other speakerphone is also connected to the communication channel. The speakerphone applies audio attenuation to the communication channel.

The technology will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

For a better understanding of the technology, reference is made to the following description, taken in conjunction with the accompanying drawings, in which like reference characters refer to like parts throughout, and in which.

Figure 1:
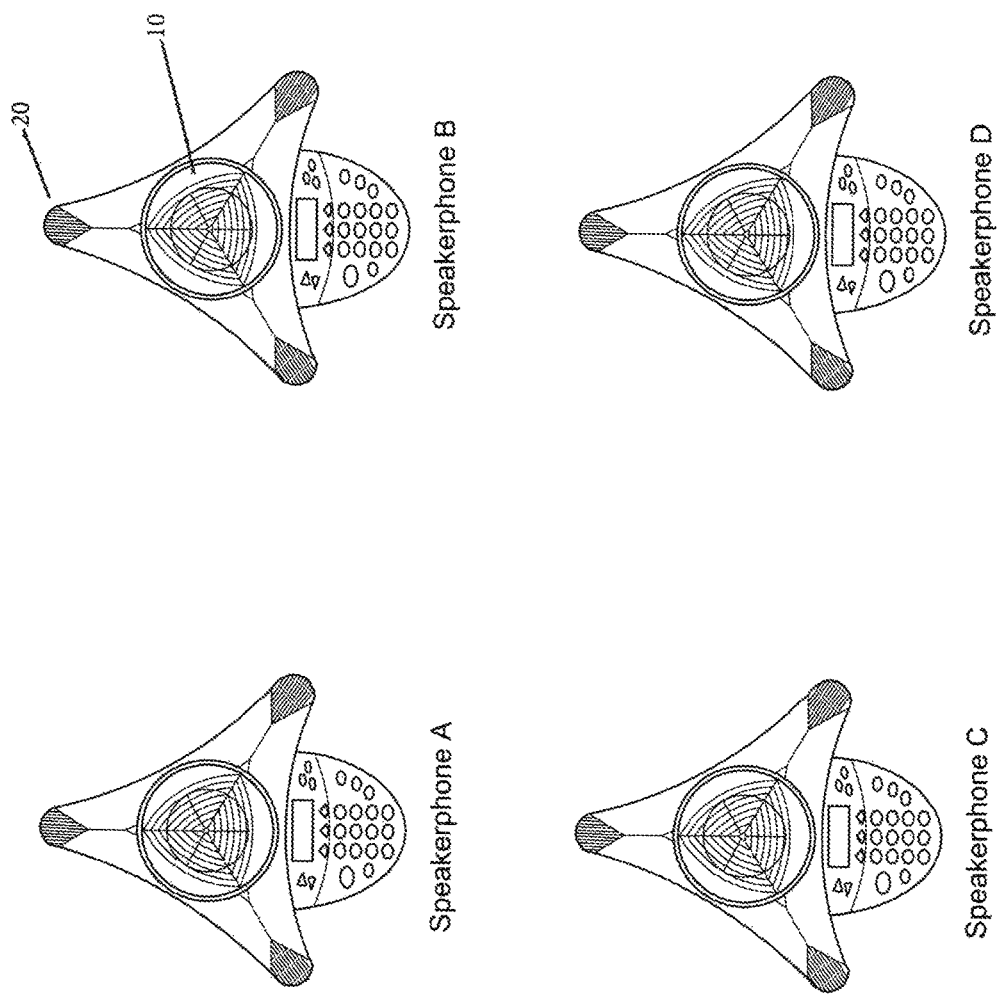
FIG. 1 is a block diagram illustrating multiple speakerphones in close proximity to each other.

The technology will next be described in connection with certain illustrated embodiments and practices. However, it will be clear to those skilled in the art that various modifications, additions, and subtractions can be made without departing from the spirit or scope of the claims.

DETAILED DESCRIPTION OF THE INVENTION

Referring to the figures in detail wherein like reference numerals identify like elements throughout the various figures, there is illustrated in FIGS. 1-7 systems and methods for optimizing a set of speakerphones A-D that are used for the same call when the speakerphones A-D are located within close physical proximity to one another. The following description will be limited to speakerphones A-D which include both a microphone 20 for receiving sound 50 and transmitting the sound 50 over a communication channel/path 40 and a speaker 10 for broadcasting sound received from the communication channel 40. However, embodiments of the technology are not so limited. The system could use any configuration of speaker/microphone pairs, speakers only and/or microphones only. Additionally, the speakerphone could be a computer running a software program that enables the computer to act as a terminal for making and receiving calls. In such a configuration, the computer running the software program will be considered the speakerphone. The computer could include its own speaker and microphone and/or an external speaker and/or microphone could be connected to the computer. The following description will also be limited to a room with 4 speakerphones A-D but those skilled in the art will recognize that any 2 or more speakerphones could be configured in accordance with one or more embodiments of the disclosed technology. Further, while the following description will be limited to traders at a trading desk, those skilled in the art will recognize that one or more embodiments of the disclosed technology can be utilized in other environments as well and that this is not a limiting factor.

Discussion of an embodiment, one or more embodiments, an aspect, one or more aspects, a feature, one or more features, or a configuration or one or more configurations is intended to be inclusive of both the singular and the plural depending upon which provides the broadest scope without running afoul of the existing art and any such statement is in no way intended to be limiting in nature. Technology described in relation to one or more of these terms is not necessarily limited to use in that particular embodiment, aspect, feature or configuration and may be employed with other embodiments, aspects, features and/or configurations where appropriate.

While not illustrated, each device in the system (speakerphone A-D, Customer Premises Equipment ("CPE") 30) will include, among others, common elements. These are conventional elements and thus their operation and interconnections will not be further discussed herein. Those or ordinary skill in the art are deemed to understand how elements such as a processor, memory, storage, input/output ("I/O") interface, communications interface and clock are electrically connected and how they send and/or receive messages via a bus. While these elements are not illustrated in the block diagrams, those skilled in the art will recognize that the speakerphones and the CPE each includes, among others, these elements and that the interaction between 2 or more of these elements is required to perform the functions of the disclosed technology.

Figure 2:
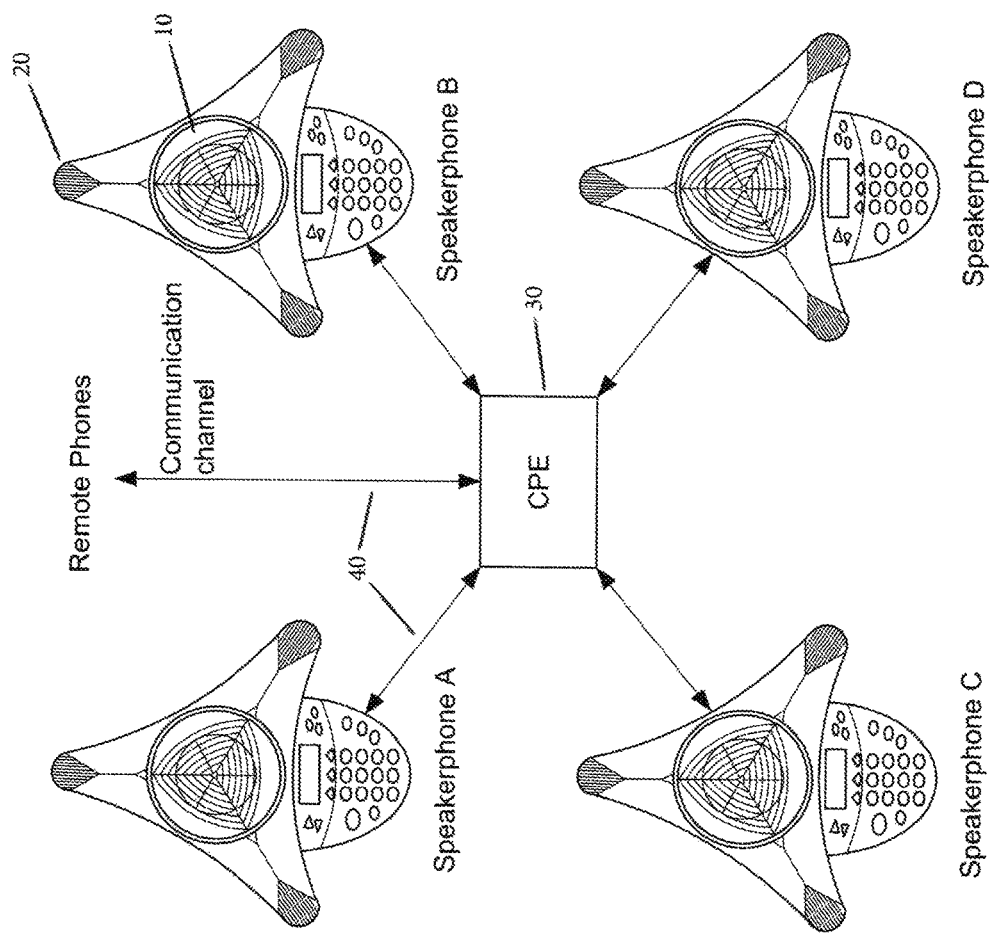
FIG. 2 provides an illustration of the speakerphones of FIG. 1 participating in a common call.
Figure 3:
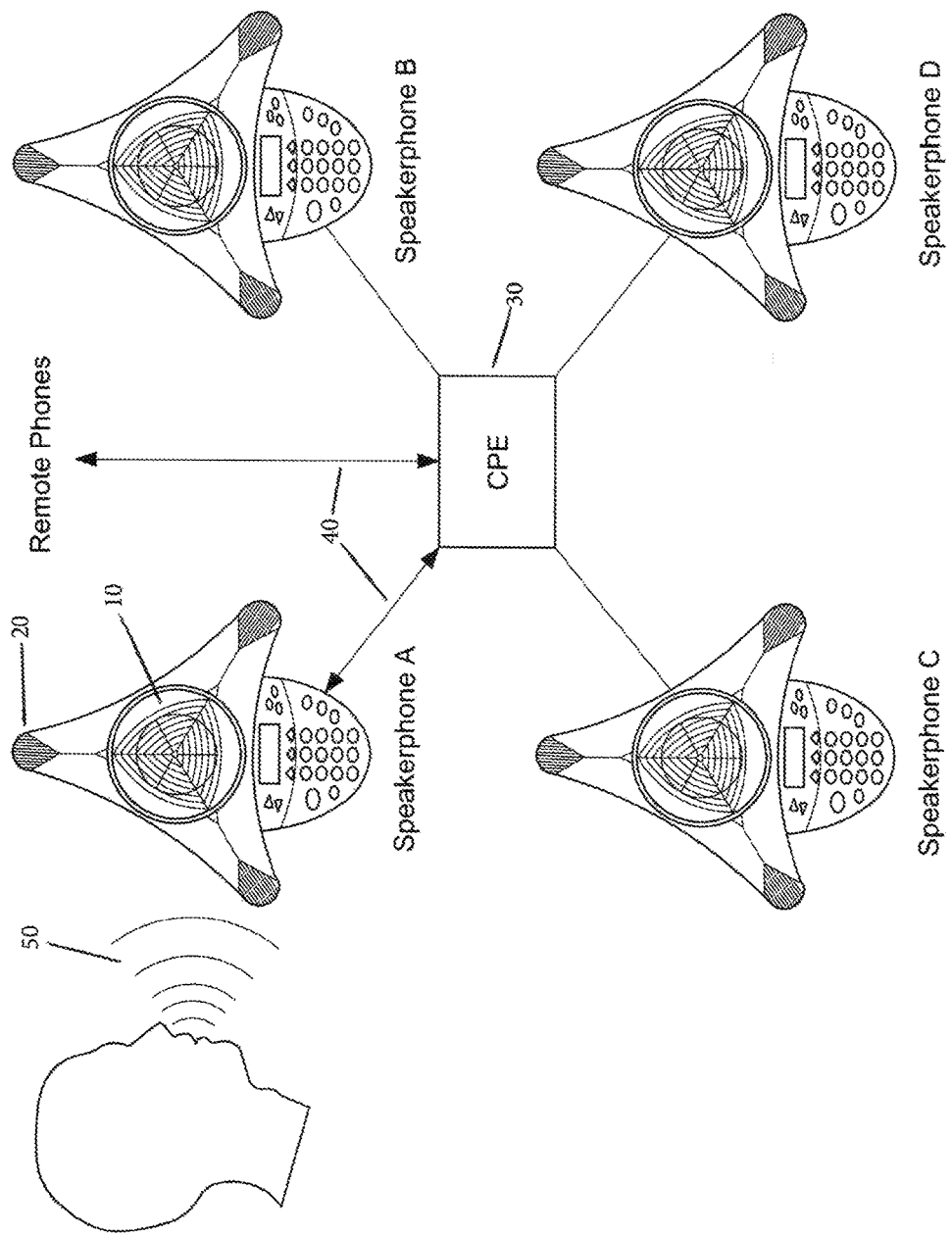
FIG. 3 provides an exemplary illustration of the speakerphones of FIG. 2 with all proximal speakerphones, other than the one with a person speaking, attenuating the sound transmitted over the common communication channel in accordance with the disclosed technology.
Figure 7:
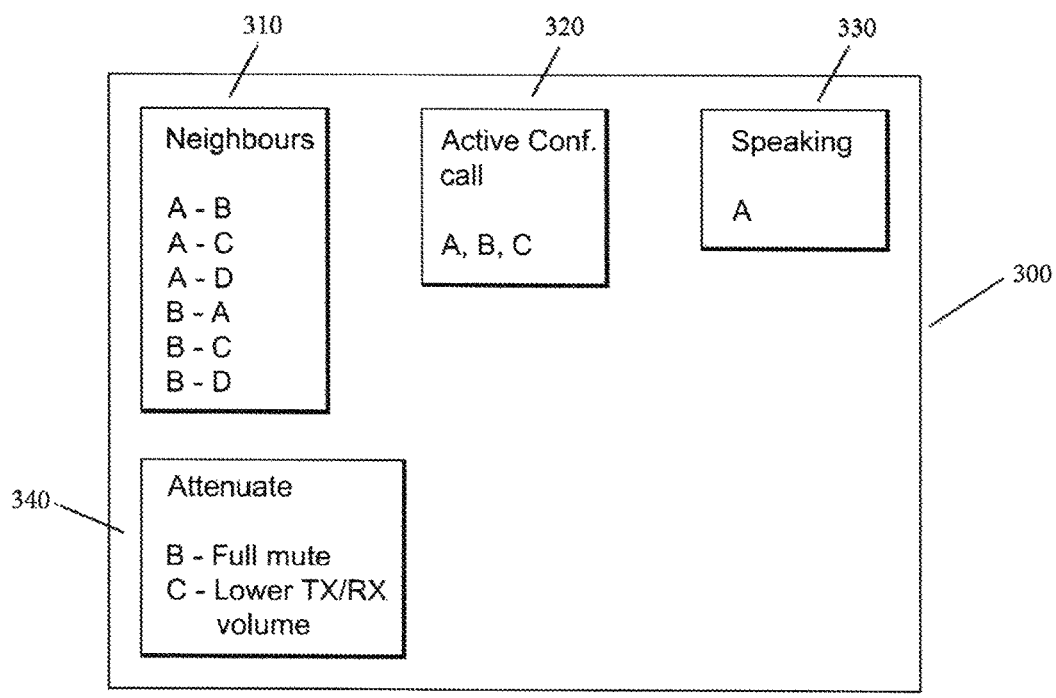
FIG. 7 provides an exemplary illustration of a customer premises equipment modifying a communications channel in accordance with the disclosed technology; and, FIG. 8 provides an exemplary illustration of the speakerphones of FIG. 2 with all proximal speakerphones, other than the one with a person speaking, attenuating the sound transmitted over the common communication channel in accordance with one or more embodiments of the disclosed technology.

As illustrated in FIG. 1, multiple speakerphones A-D are located within close physical proximity to one another. The definition of close is a relative term and is thus a design choice of the system. For example, the louder the speakerphones A-D are and the less obstacles that there are between them (e.g. plants, cubicle walls, books, etc.) the farther apart they can be and still be considered close and visa versa. As illustrated in FIGS. 2 and 7, there will be times when 2 or more of the speakerphones A-D will be used for the same conference call. For purposes of this discussion, the conference call may be referred to as the communication channel 40. For purposes of the description the communication channel may be digital, analog or some combination thereof. Additionally, while the call may be referred to as a conference call, those skilled in the art will recognize that the technology is not so limited. The call could be a conference call, a three-way call, a single call with multiple extensions or any other type of call with multiple speakers in close physical proximity connected to the same call. As illustrated in FIGS. 3 and 7, when one person is speaking 50/330 into one of the speakerphones A (for example), all speakerphones B-D that are deemed to be in close proximity to that speakerphone attenuate the communication channel 40. Those skilled in the art will recognize that the attenuation may be the same for each speakerphone or it may vary by speakerphone or groups of speakerphones. For example, in FIG. 3, Speakerphone A is receiving the voice from the user. Speakerphone C may be fully suppressed, while speakerphones B and D may only decrease the volume or possibly not suppress the volume at all. Any combination is possible depending on the design choices of the person/people configuring the system/speakerphones. In addition, while not preferable, the speaker 10 and microphone 20 for each unit may be attenuated differently. For example, it may be beneficial for the speaker 10 to be fully suppressed but have the microphone 20 only attenuated so that if the person on one of the attenuated speakerphones begins to speak the first part of their statement is not cut off. Alternatively, it may be beneficial to have the situation reversed to avoid feedback howling.

Figure 4:
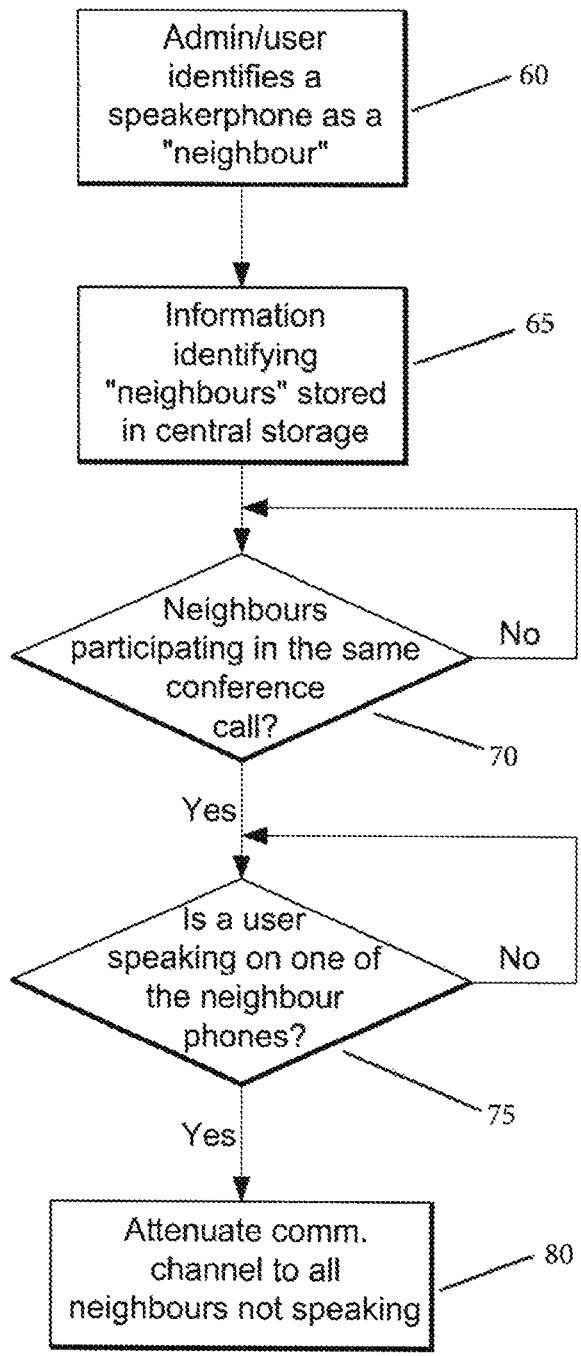
FIG. 4 provides an exemplary flowchart illustrating manual configuration of a speakerphone in accordance with the disclosed technology.

Manual configuration: In one or more embodiments, as illustrated in FIG. 4, the system allows a system administrator or user (depending on the rights provided, which is a design choice for the owner of the system) to claim another speakerphone as a "neighbor" 60. For purposes herein a "neighbor" is a speakerphone that is considered to be in close physical proximity to the speakerphone in question. Speakerphones may be identified by their assigned user (e.g. Fred Jones), by their telephone number, by their Internet Protocol ("IP") address, or by any other identifying trait that can be uniquely assigned to that speakerphone (including but not limited to fictitious names). Once identified, the identity of neighbors is stored 65 in a central storage 310 (FIG. 7). When the system determines that two or more neighbors are participating in the same call 70, that information is noted at the CPE 320 (FIG. 7). When the CPE determines that a speakerphone is receiving voice signals at its microphone 75, the CPE identifies the speakerphone 330 (FIG. 7) and attenuates, or causes to be attenuated, communication channel 40 to the remaining participating speakerphones 340 (FIG. 7). In one or more embodiments, once the system receives a notification that two speakerphones are claimed as neighbors the system applies, or causes to be applied, a fixed amount of audio attenuation between those two speakerphones every time those two speakerphones are connected to the same communication channel. In this way when either user speaks the other speakerphone will not broadcast that user's speech (or it will broadcast the speech at a lower volume). Those skilled in the art will recognize that while it is preferable to apply a fixed amount of attenuation, the system is not so limited. It is also possible that the attenuation is variable based on certain thresholds (e.g. background noise, the number of speakerphones on the conference call, the volume of the person speaking, etc.). Additionally, the attenuation may be minimal through full suppression depending on the needs or desire of the system and its users. In a preferred embodiment the default attenuation is full muting, −90 dB for example. Although any amount of attenuation may be set as the default. The amount of attenuation applied may be configurable as some users may still want to hear some other users at a lower level than the remote user's level or may want to hear them with no attenuation.

A speakerphone can also be defined as a neighbor at the system level by use of groups. For example, a system administrator can create one or more groups in a database or some other list that is called by the system and add or remove speakerphones from a group. Groups may be defined by a physical location such as a desk or a room, etc. or they may be defined as a range of identifiers such as speakerphones 1-15, etc. Thus, all speakerphones that connect to the group are automatically considered neighbors.

The system may, but is not required to use real time and historic analytics of round trip delay time, variation of delay over time between speakerphones, trace route number of hops between speakerphones, source and destination IP of speakerphones, etc. to keep track of speakerphone locations and usage and make a determination to enable or disable the neighbor feature between speakerphones at least partly based on this information.

In the event that the system is configured to identify speakerphones by their user's name, when a user is working from a location that is no longer in close proximity with his/her neighbor(s) the user may inform the system that he/she is working from a different location. Being so informed, the system will temporarily remove that phone from the neighbor list or place a flag on that speakerphone indicating that the CPE should not apply the attenuation between that user and other speakerphones that are normally defined as neighbors. The user may be provided a button on the phone or an option after logging into the system for informing the system of the change of location.

Figure 5:
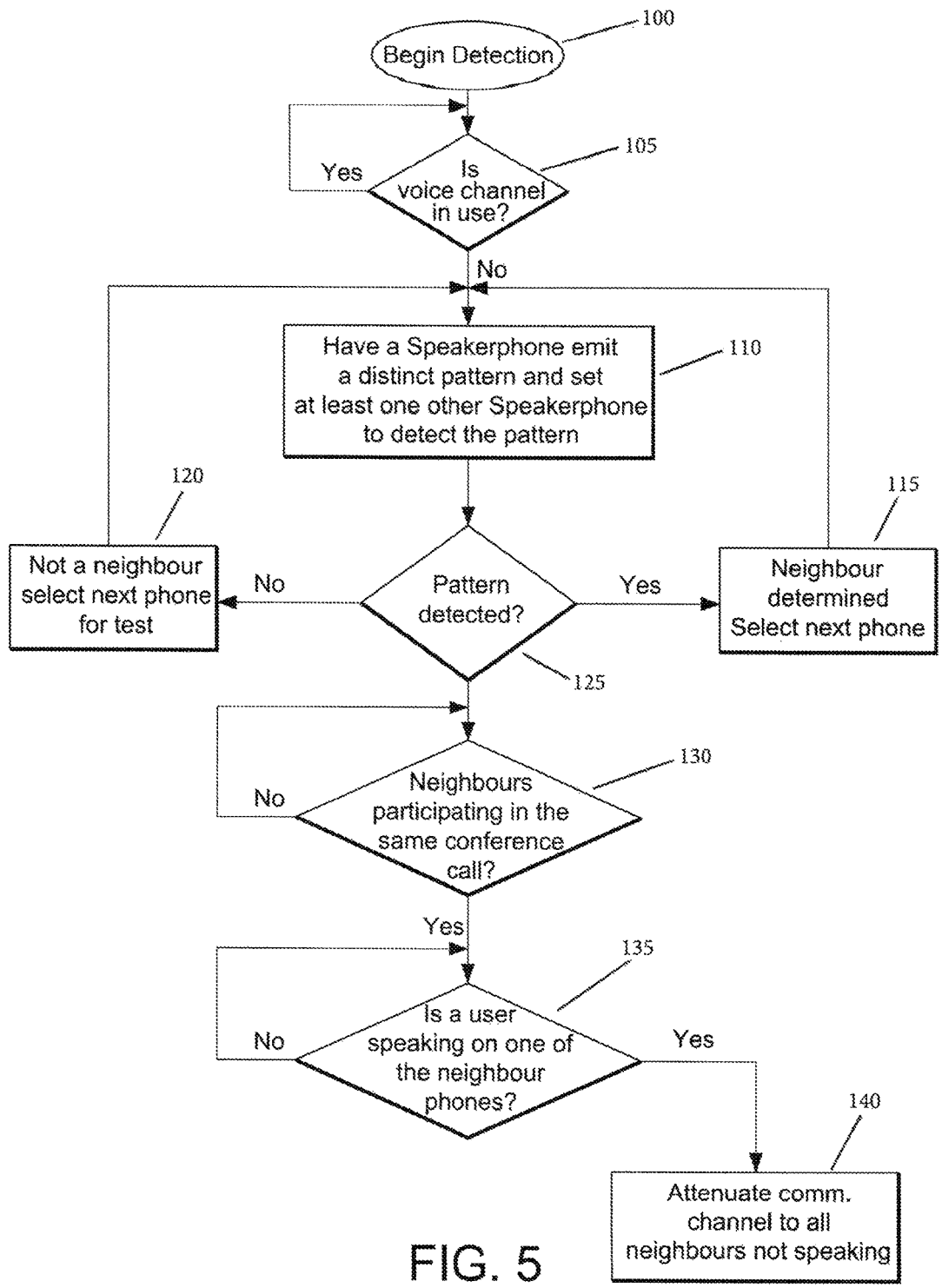
FIG. 5 provides an exemplary flowchart illustrating automatic configuration of a speakerphone in accordance with the disclosed technology.
Figure 6:
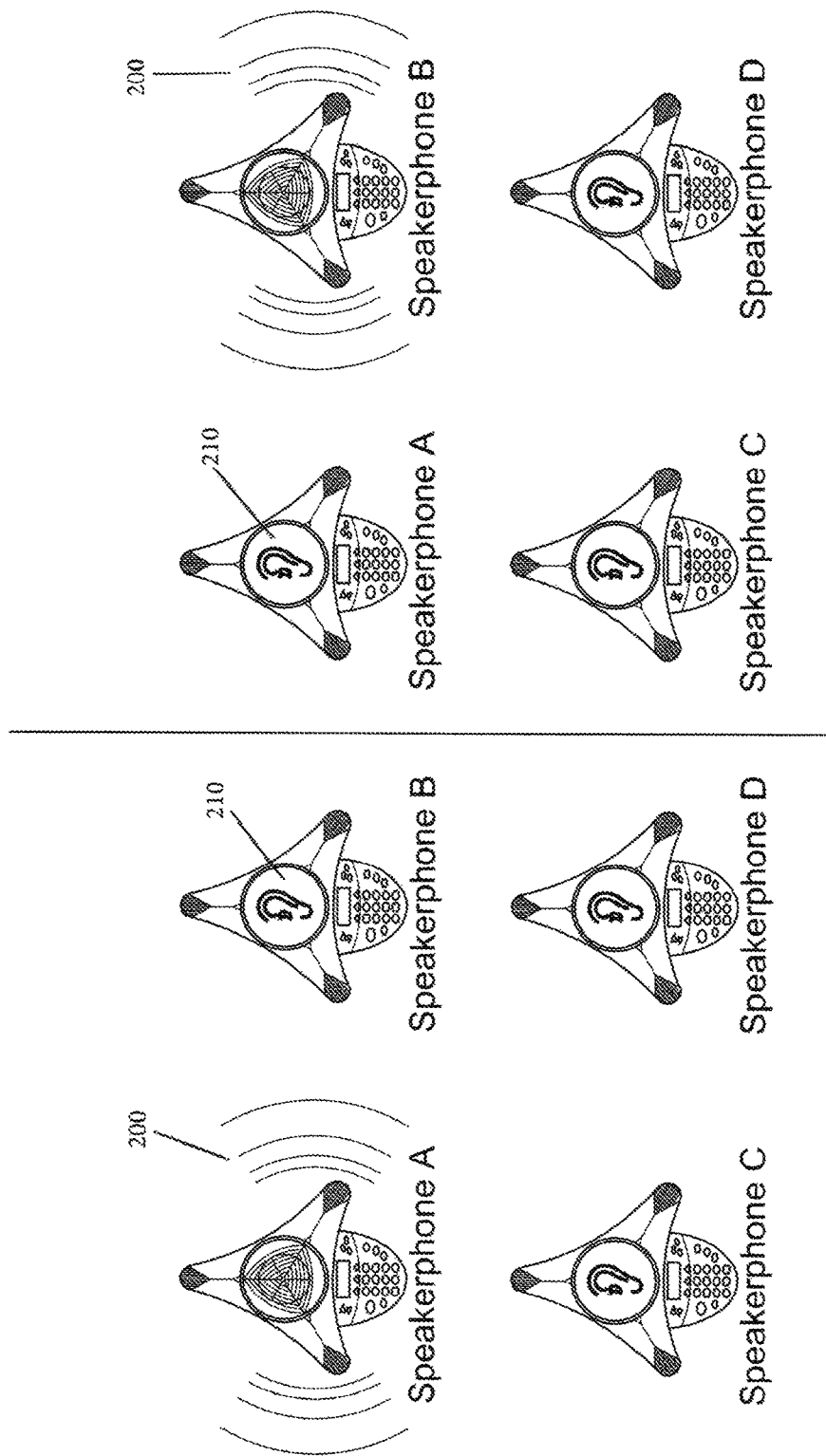
FIG. 6 provides an exemplary illustration of speakerphones of FIG. 1 automatically determining neighbors in accordance with the disclosed technology.

Automatic configuration: As illustrated in FIGS. 5 and 6, the determination/identification of neighbors may be automated. To expedite and automate the process of configuring speakerphones as neighbors a method is provided for detecting users within close proximity. Because each speakerphone A-D typically has a microphone 20 and loudspeaker 10 to use the system the loudspeaker 10 and microphone 20 can be used to detect other speakerphones in close physical proximity. The type of loudspeaker 10 and microphone 20 used will affect the ability and range of detection. Ideally an omnidirectional microphone 20 and loudspeaker 10 would be available but the system can also be used on directional microphones 20 and speakers 10 where the detection is operating beyond the critical distance of the microphone 20 in the middle to upper range of hearing.

It is desirable for the system to run the automatic detection 100 of neighbors during a time when the voice channel is not in use by the user 105, although this is not a requirement. When the neighbor detection feature is started 100 the system may choose to enable or disable audio processing elements in the path of the test so that the desired frequency range used for the test is not attenuated or distorted. The system may also choose to increase the gain of the user's microphone 20 or speaker 10 audio to increase the dynamic range of the signal that will be analyzed.

When activated 100 (FIG. 5) the system cycles through speakerphones and emits narrow band signals with an adjustable pulse time and pauses between signals at frequencies either in or above the human hearing range 110. It is desirable, but not required that the narrow band signals be near ultrasonic, near or above 18 KHz, as it would make the feature imperceptible to users around it. In this way the system can be activated often enough to detect user proximity changes dynamically, for example one user walking towards another user or one user walking away from another user. In those cases, the algorithm can apply neighbor attenuation dynamically as the user approaches or walks away.

For cases where the system is unable to produce frequencies above most of the populations hearing range, lower frequency narrow band signals can be used. In such a case the detection may be run at off hours or at a time where users would not be effected by a short pulse of tones used for neighbor identification.

A binary pattern is transmitted 200 (FIG. 6) using methods such as differential Manchester encoding, or frequency shift keying (FSK) modulation. As illustrated in FIG. 6, this pattern will be generated for brief periods of time from one speakerphone at a time 110 (FIG. 5) and then multiple speakerphones will be set to listen for/detect 210 (FIG. 6) the pattern during that time period (they could be set one at a time, in groups or all at once depending on the design choice of the system). Regardless of the encoding method a distinct start and distinct end pattern is used so that speakerphones designated as listeners of the detection algorithm can determine, with some confidence, that a pattern was indeed detected multiple times during the relatively short time period the pattern was being transmitted.

Once a speakerphone has detected the pattern 125 it informs the system that a neighbor match has been made 115. The notification may be sent to the speakerphone generating the signal and/or to a customer premises equipment such as a Public Branch Exchange (PBX) or Key System. In one or more embodiments an attenuation determined by a configuration parameter is thus automatically applied to both speakerphones. A list of neighbors is updated at the system level where administrators can monitor, add and remove speakerphones as neighbors manually if required at real time and/or at off times. In one or more embodiments, when the system determines that two or more neighbors are participating in the same call 130 and the CPE determines that a speakerphone is receiving voice signals at its microphone 135, the CPE attenuates, or causes to be attenuated, communication channel 40 to the remaining participating speakerphones 140. Once a speakerphone is determined to be a neighbor it does not need to be, although it may be, set to detect the test signals when the neighbor is set to transmit such signals. In this way, system resources may be conserved.

The hardware/software for attenuating the communication channel for a particular speakerphone may be located within the speakerphone, at a central location or shared between the central location and the speakerphone. In one or more embodiments, the speakerphones are connected to a PBX such as an IP PBX or an ISDN PBX or a Key Switch. The identity of each speakerphone is stored in the central location and when the central location determines that multiple neighbor speakerphones are connected to the same conference call the central location adds the attenuation to the appropriate speakerphones as described above. In one or more embodiments, the central location sends a message or signal to the appropriate speakerphone(s) and the phone itself applies the appropriate attenuation as described above. In one or more embodiments, the speakerphones determine based on the caller id signals received that they are on a conference call with a neighbor speakerphone and the appropriate speakerphone(s) apply the attenuation as described above. Those skilled in the art will recognize that there are different ways to add audio attenuation to a speakerphone. In one or more embodiments, the attenuation is added to the communication channel (in one or both directions). In one or more embodiments, the speakerphone adds the attenuation to the level of the speaker and/or the microphone of that speakerphone. In one or more embodiments, there is a combination of the above.

Figure 8:
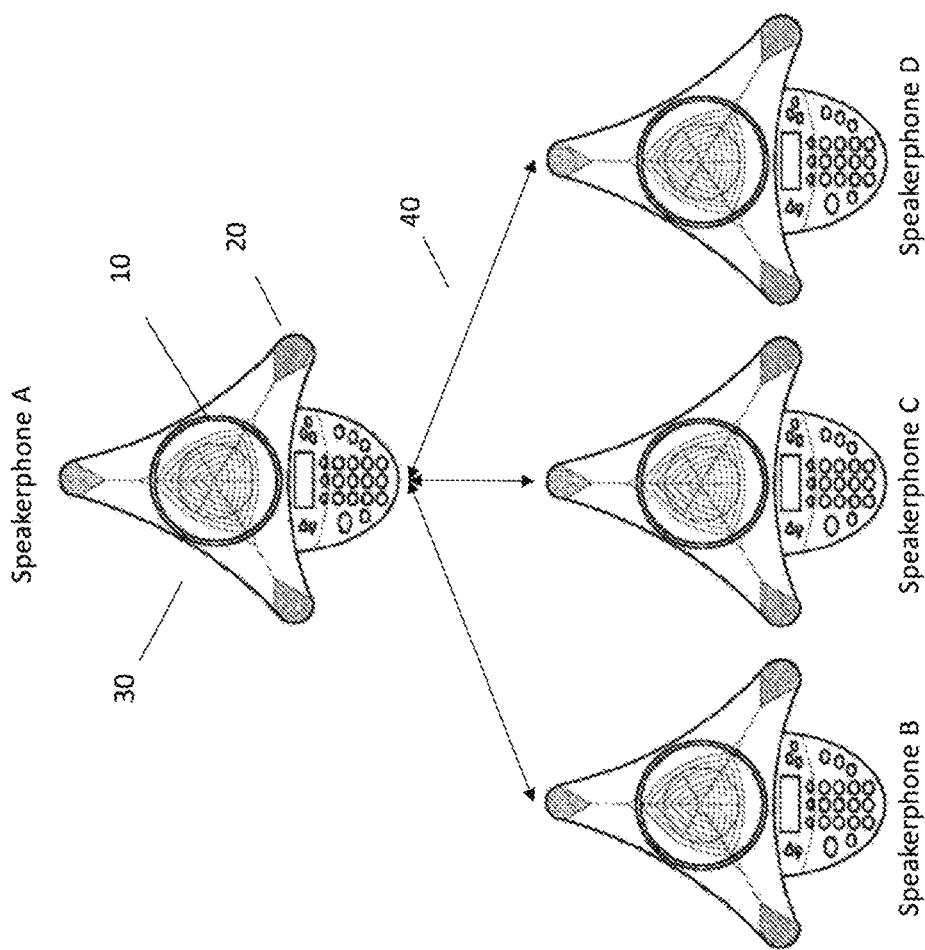

FIG. 8 illustrates that in one or more embodiments of the technology, one or more of the speakerphones can act as a CPE. A speakerphone configured as such (A in FIG. 8) will receive multiple independent voice streams and process each voice stream at the speakerphone to determine if the voice streams should be conferenced together and/or if attenuation is appropriate or not as discussed above.

Having thus described preferred embodiments of the invention, advantages can be appreciated. Variations from the described embodiments exist without departing from the scope of the invention. Thus it is seen that systems and methods for attenuating a communications channel on a "neighbor" speakerphone are provided. Although particular embodiments have been disclosed herein in detail, this has been done for purposes of illustration only, and is not intended to be limiting with respect to the scope of the claims, which follow. In particular, it is contemplated by the inventors that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implemented, at least in part, using a computer system, it will be appreciated that a computer program for implementing at least part of the described methods and/or the described systems is envisaged as an aspect of the invention. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by one or more application specific integrated circuits and/or optical elements. Suitably, the computer program can be stored on a carrier medium in computer usable form, which is also envisaged as an aspect of the invention. For example, the carrier medium may be solid-state memory, optical or magneto-optical memory such as a readable and/or writable disk for example a compact disk (CD) or a digital versatile disk (DVD), or magnetic memory such as disk or tape, and the computer system can utilize the program to configure it for operation. The computer program may also be supplied from a remote source embodied in a carrier medium such as an electronic signal, including a radio frequency carrier wave or an optical carrier wave.

It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall there between.

Having described the invention, what is claimed as new and secured by Letters Patent is:

1. A system for attenuating a communication channel, the system comprising:
   a customer premises equipment ("CPE");
   said CPE configured to electrically communicate with a plurality of speakerphones; wherein said CPE is configured to identify at least two of said plurality of speakerphones as neighbors in a room by instructing one of said at least two speakerphones to emit a signal having a pattern from a speaker on said one of said at least two speakerphones, instructing said another of said at least two speakerphones to set a microphone on said another of said at least two speakerphones to detect said pattern; and being informed that said pattern was detected;
   said CPE configured to communicate with a remote terminal via the communication channel;
   said CPE being configured to apply audio attenuation to the at least two of said plurality of speakerphones identified as neighbors when the at least two of said plurality of speakerphones are simultaneously connected to the communication channel.

2. The system according to claim 1 wherein said audio attenuation is fixed.

3. The system according to claim 1 wherein said audio attenuation is variable.

4. The system according to claim 1 wherein said audio attenuation is the same for each of said at least two of said plurality of speakerphones.

5. The system according to claim 1 wherein said audio attenuation is different for each of said at least two of said plurality of speakerphones.

6. The system according to claim 1 wherein said customer premises equipment is a private branch exchange (PBX) and said PBX attenuates said communication channel.

7. The system according to claim 1 wherein at least one of said at least two speakerphones is configured to attenuate said communication channel.

8. The system according to claim 1 wherein said attenuation includes muting said communication channel.

9. The system according to claim 1 wherein each of said speakerphones includes a microphone and said audio attenuation includes attenuating said microphone of at least one of said at least two of said plurality of speakerphones.

10. The system according to claim 1 wherein each of said speakerphones includes a speaker and said audio attenuation includes attenuating said speaker of at least one of said at least two of said plurality of speakerphones.

11. A method of attenuating a speakerphone, wherein the least two speakerphones are connected to a common communication channel with a remote terminal; said method comprising:
a customer premises equipment ("CPE") detecting that said at least two speakerphones are neighbors in a room by instructing one of said at least two speakerphones to emit a signal having a pattern from a speaker on said one of said at least two speakerphones, instructing said another of said at least two speakerphones to set a microphone on said another of said at least two speakerphones to detect said pattern; and said another of said at least two speakerphones informing the CPE that said pattern was detected;
said CPE detecting that a voice signal is being received by a microphone of one of said at least two speakerphones; and, said CPE applying audio attenuation to another of said at least two speakerphones.

12. The method according to claim 11 wherein said applying attenuation includes attenuating said communication channel to said another of said at least two speakerphones.

13. The method according to claim 12 wherein said attenuating said communication channel to said another of said at least two speakerphones includes muting said communication channel to said another of said at least two speakerphones.

14. The method according to claim 11 wherein said applying attenuation includes instructing said another of said at least two speakerphones to attenuate a microphone of said another of said at least two speakerphones.

15. The method according to claim 11 wherein said applying attenuation includes instructing said another of said at least two speakerphones to attenuate a speaker of said another of said at least two speakerphones.

16. The method according to claim 11 further including said CPE applying audio attenuation to said one of said at least two speakerphones.

17. A method of attenuating a speakerphone, said method comprising:
a speakerphone determining that at least one other speakerphone is a neighbor in a room with the speakerphone by the speakerphone emitting a signal having a pattern from a speaker on the speakerphone, instructing the at least one other speakerphone to set a microphone on the at least one other speakerphone to detect said pattern; and said at least one other speakerphone informing the speakerphone that said pattern was detected;
said speakerphone connecting to a communication channel to communicate with a remote terminal;
said speakerphone determining that said at least one other speakerphone is also connected to the communication channel;
said speakerphone applying audio attenuation to said communication channel.

18. The method according to claim 17 further including said speakerphone instructing said at least one other speakerphone to apply audio attenuation to the communication channel.

* * * * *